April 6, 1965  V. J. LUNDELL  3,177,045
ROLLER ASSEMBLY
Filed Sept. 4, 1962  2 Sheets-Sheet 1

INVENTOR.
VERNON J. LUNDELL
BY Wolfe, Hubbard,
Voit & Osann
ATTORNEYS.

April 6, 1965  V. J. LUNDELL  3,177,045
ROLLER ASSEMBLY

Filed Sept. 4, 1962  2 Sheets-Sheet 2

INVENTOR.
VERNON J. LUNDELL
BY Wolfe, Hubbard,
Voit & Osann
ATTORNEYS.

3,177,045
ROLLER ASSEMBLY
Vernon J. Lundell, Cherokee, Iowa, assignor to Massey-Ferguson Services N.V., Curacao, Netherlands Antilles, a corporation of Netherlands Antilles
Filed Sept. 4, 1962, Ser. No. 221,294
4 Claims. (Cl. 308—187)

The present invention relates generally to agricultural machines of the type intended primarily for treating forage crops and concerns more particularly an improvement in such machines for forming forage crop material into wafers.

Recently there have been developed machines of practical utility for converting forage crop material into relatively small, dense, and uniform blocks called wafers or pellets. These machines include means for chopping and co-mingling stems and leaves of the crop material and a wafering mechanism into which the co-mingled mass is delivered and by which it is compacted into wafer form. The wafering mechanism includes a series of die cells and means for urging the crop material into and through the die cells so as to thereby form it into the wafers. It will be apparent that the wafering mechanism includes movable elements which are brought into contact with the co-mingled mass of chopped stems and leaves and that such engagement is effected with considerable force in order to accomplish wafering of the material. For efficient operation of the mechanism relatively movable parts should be kept free for efficient operation of the mechanism. Yet impacting of the crop material between adjacent parts has been experienced and it is toward the alleviation of this condition that this invention is directed.

The present invention lies in the provision in a forage crop wafering machine having a wafering mechanism including a series of adjacent die cells with the entrance ends of the cells opening from an extruder-feed chamber in which the crop material is received and from which it is expressed into the die cells, of a roller assembly comprising a roller and means for mounting the roller for traversing a path within the extruder-feed chamber immediately adjacent and in juxtaposed relation to the entrance ends of the die cells for compacting the crop material into the cells, with the roller mounting means including a supporting arm, a shaft carried by said arm, an antifriction bearing journalling the roller upon the shaft, and a closure including a resilient seal carried by said roller and extending across the bearing for minimizing the possibility of entrance internally of the roller of any material from the extruder-feed chamber and for minimizing the escape of lubricant from the bearing.

An example of a wafering mechanism embodying the present invention is shown in the accompanying drawings, in which.

Figure 1:
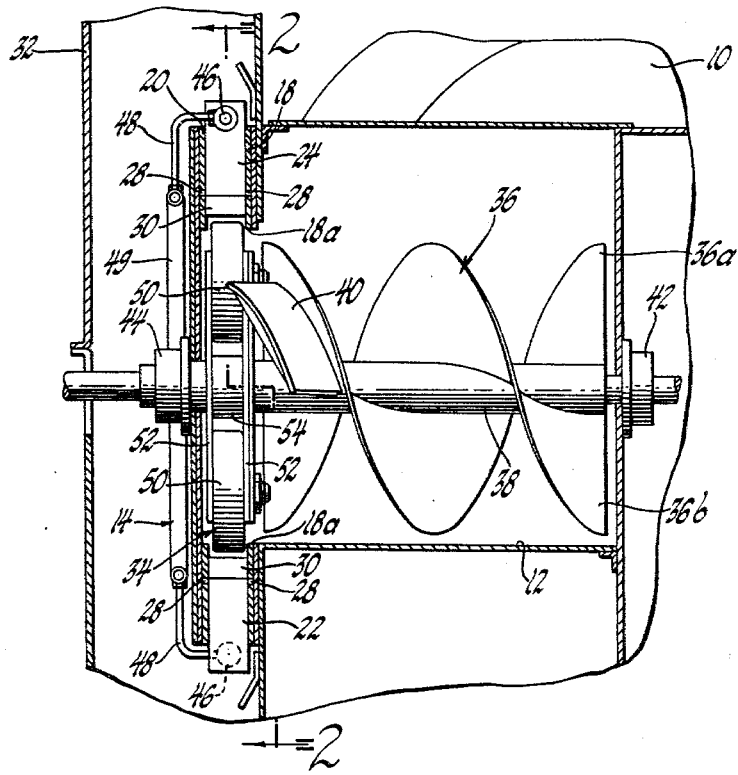
FIGURE 1 is a fragmentary transverse vertical section of a wafering mechanism and means for transferring crop material into the same.
Figure 2:
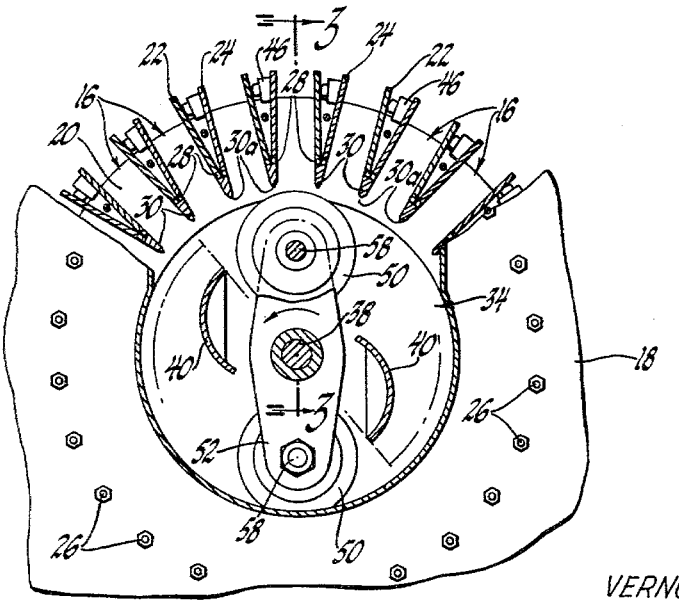
FIG. 2 is a sectional view taken in offset planes as indicated by the line 2—2 in FIG. 1.
Figures 3, 4:
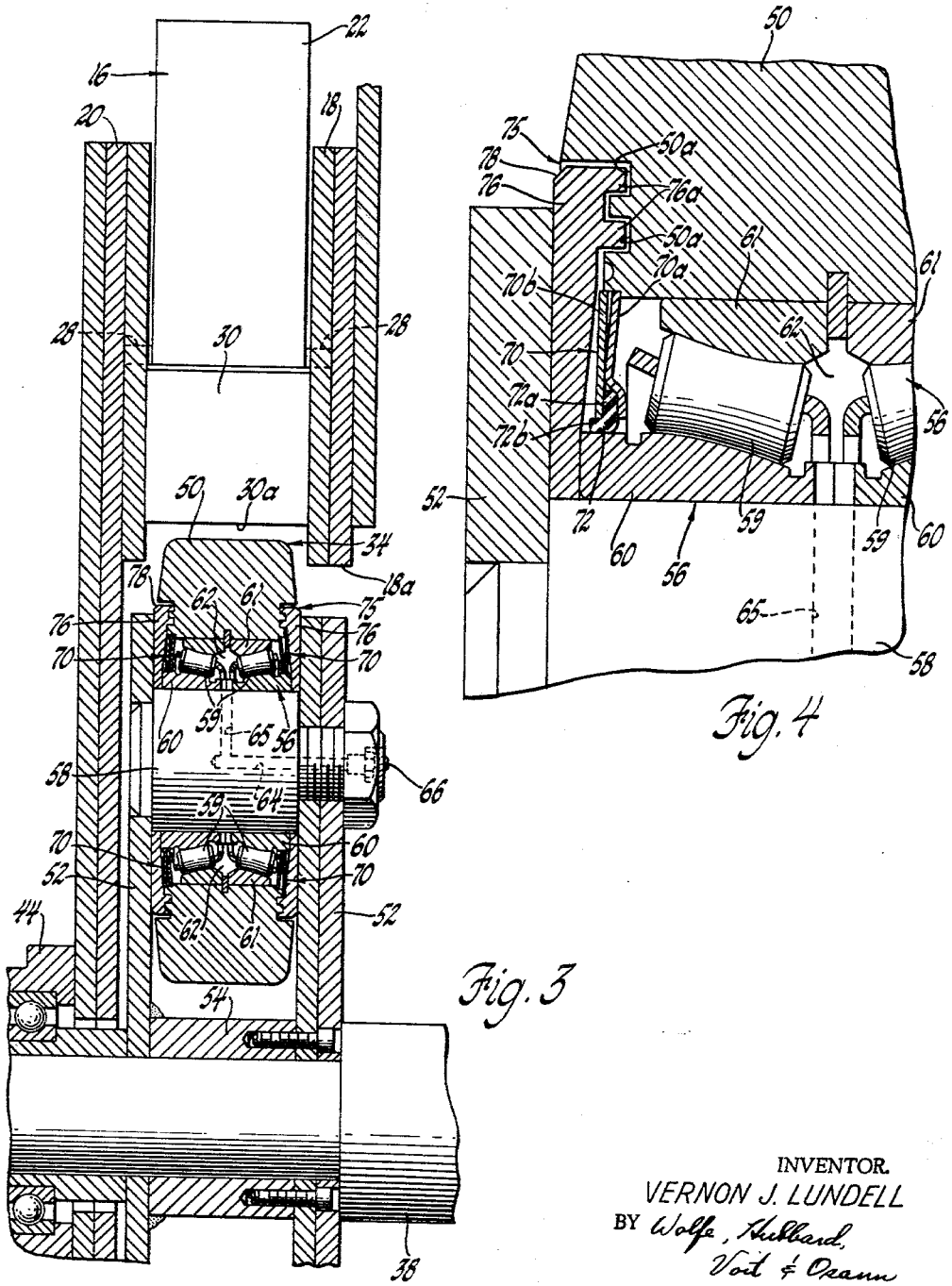
FIG. 3 is a fragmentary vertical section taken substantially in the plane of line 3—3 in FIG. 2.
FIG. 4 is a fragmentary sectional view on an enlarged scale of a portion of the wafering mechanism shown in FIG. 3.

While the invention is illustrated and described in connection with a particular embodiment, it is to be understood that it is not thereby intended that the invention be limited to this particular embodiment. On the contrary it is intended to include all alternative constructions and modifications that are embraced within the spirit and scope of the invention as expressed in the appended claims.

Wafering machines of the type here concerned conventionally includes means for receiving, chopping and co-mingling forage crop material and delivering it to the wafering mechanism. Such a receiving and chopping means have not been illustrated in the accompanying drawings. Suffice it to say, however, this means delivers the chopped and co-mingled leaves and stems by way of a chute 10 into a hopper 12 from which it is delivered into a wafering mechanism, generally indicated at 14. The wafering mechanism 14 includes means defining a series of die cells 16 of converging cross-section from their entrance ends or openings toward their exit ends. The forage crop material is delivered into juxtaposition with respect to the entrance of the die cells and the juxtaposed portions of the crop material are continuously forced into the cells so that the same is formed into pressed masses within the cells. As more and more of the crop material is forced into the die cells, that compressed within the cells is caused to extend beyond their exit ends where it is separated into substantialy predetermined lengths comprising the wafers.

In the illustrative device the means defining the die cells of the wafering mechanism 14 includes side plates 18 and 20 and transverse partitions 22 and 24. As shown, the side plates are disposed in spaced parallel relation to each other and are maintained in such relation by means of through bolts 26. The partitions 22 and 24 are interposed between the spaced side plates 18 and 20. The inner faces of the side plates define the transverse walls of the die cells. At their inner ends each of the partitions 22 and 24 is equipped with a longitudinally disposed pin 28 which is extended outwardly beyond the side edges of the partitions for inception in appropriate apertures formed in the side plates 18 and 20.

Inwardly of the pins 28 toward the entrance ends of the die cells the longitudinal cell walls are defined by tips 30. The tips are preferably formed of hardened steel and present outwardly diverging longitudinal faces. The tips terminate at their inner ends in sharpened edges 30a. Outwardly of the tips, the partitions 22 and 24 are arranged in oppositely facing pairs, back-to-back, to the end that their front faces define oppositely disposed longitudinal walls of the die cells 16 which converge. With this converging disposition of the partitions 22 and 24 and the outwardly diverging form of the tips 30 the die cells are thus of outwardly converging cross-section from their openings or entrance ends toward their exit ends.

In the illustrative wafering mechanism 14 the die cells are radially disposed in an annular arrangement with their inner or entrance ends defining the inner pheriphery of the annulus and their exit ends defining the outer perphery thereof. The wafering mechanism 14 is disposed within a housing 32 which not only encloses the mechanism but also serves to receive the wafers of forage crop material formed by the wafering mechanism 14. The space within the inner periphery of the annulus of die cells comprises an extruder-feed chamber 34.

The loose mass of chopped forage crop material is transferred from the hopper 12 into extruder-feed chamber 34. An access opening 18a is formed in the right side wall of the housing 32 and the side plate 18 thereby providing communication between the hopper 12 and the extruder-feed chamber 34.

Means is provided for conveying the crop material from the hopper 12 through the opening 18a. In the illustrative device this means comprises an auger type conveyor 36. As shown the conveyor 36 is composed of two helical flights 36a and 36b which are rigid with a shaft 38. The terminal faces of the auger flights are equipped with vanes 40 which are of arcuate form and extend into the extruder-feed chamber 34 to insure delivery of the crop material into proximate juxtaposition over the entrance ends of the die cells 16. The right end of the shaft 38 is journalled in a bearing 42 which is mounted on the right end wall of the hopper 12 as shown in FIG. 1. The shaft 38 extends through the hopper 12 and co-axially through the extruder-feed chamber 34 and is journalled at its left end in a bearing 44 mounted on the outer wall 20 of the wafering mechanism 14 which closes that side of the extruder-feed chamber.

To obtain density control of the forage crop compacted within the die cells, means is provided for varying the cross-sectional area of the die cells. In the illustrative wafering mechanism die cell cross-section alteration is accomplished by varying the spacing between the longitudinal cell walls 22 and 24. As hereinbefore noted, the walls 22 and 24 are arranged in pairs, back-to-back, and at their inner ends they are mounted upon pivot pins 28. Thus means is provided to rock the plates 22 and 24 upon the pivot pins 28. As shown, this means includes a small pressure fluid actuator 46 in the form of a piston and cylinder interposed between the outer ends of the back-to-back pairs of the die cell walls 22 and 24. Pressure fluid is simultaneously supplied to the actuators by suitable connections 48 from a common pressure fluid manifold 49. It will be seen that as the forage crop material progresses through the die cells the forage is reduced in cross-sectional area by the action thereupon of the cell walls and the force exerted is dependent upon the fluid pressure that is uniformly applied to each of the actuators thereby applying the same compressive force to the crop material in each of the cells and thus wafers of uniform density are formed.

Preferably the conveyor 36 is rotated at a relatively high speed so as not only to transfer the chopped crop material received in the hopper 12 from the hopper into the extruder-feed chamber 34, but in so doing to impart thereto a whirling motion to the end that the crop material is distributed, centrifugally, about the periphery of the extruder-feed chamber over the entrance ends of the die cells 16.

Means is provided for forcing the crop material that is disposed about the extruder-feed chamber 34 and over the entrance ends of the die cells 16 into the die cells and against the knife edges 30a to sever the crop material that is forced into one die cell from that that is forced into the next adjacent cells. For this purpose the exemplary wafering mechanism 14 utilizes a pair of rollers 50 of substantial mass. The rollers are carried by a frame which includes a pair of diametrically extending arms 52 disposed within the extruder-feed chamber 34. Centrally thereof the arms are fastened to a spacer sleeve 54 which is fixed upon the shaft 38 for rotation therewith. The rollers 50, as shown, are of annular form and are journalled by means of bearings 56 upon stub shafts 58. The stub shafts 58 are mounted between the outer ends of the arms 52 and are so located that the peripheral surfaces of the rollers 50 traverse a path close to but spaced slightly from the periphery of the extruder-feed chamber 34 as defined by the entrance ends of the die cells 16 determined by the knife edges 30a. As shown the bearings 56 are of the radial-thrust type and include a series of antifriction roller elements 59 trained between inner and outer races 60 and 61 respectively. Each of the bearings 56 includes two sets of roller elements 59 which are spaced apart and define a lubricant chamber 62 therebetween. The stub shaft 58 upon which the roller is mounted is provided with an axial passage 64 which intersects a radial passage 65. By means of these passages lubricant is introduced into the central annular chamber between the trains of bearing elements 59. The outer end of the axial passage 64 is equipped with a fitting 66 by way of which lubricant can be introduced under pressure to supply the bearing.

In accordance with one aspect of the present invention each of the roller journalling bearings 56 is equipped with seals 70 which are carried by the rollers 50 so as to retain the lubricant within the bearing. And further, because of the nature of the crop material and the environment in which the roller assembly is operated, special provision is made to preclude the entry of crop material, dust, dirt and the like, internally of the roller so as to minimize jamming that would impair roller rotation and to minimize wear. Thus, the bearing seals are specially formed, and in addition provision is made to preclude the impacting of material between the rollers 50 and their supporting arms 52, internally of the rollers, and externally of the seals.

As shown seals 70 include a pair of annular plates 70a and 70b disposed in back-to-back relation and secured at their peripheries to the roller 50 internally thereof. The outermost of the plates 70b are planar and of generally annular form. The inner ones of the plates, i.e., those more closely adjacent the bearings 56 are annularly dished so as to engage respectively the outer plates 70b intermediate the inner and outer edges thereof and at their edges the two plates of the pair to be spaced apart. Internally of the plates 70b and 70a there is interposed between them a seal 72 of resilient material of generally L-shaped section. The resilient seal 72 thus has a radially extending flange 72a that is gripped between the juxtaposed surfaces of the lubricant retainer plates and a generally cylindrical central portion 72b which circumferentially engages the outwardly-facing oppositely-disposed surface of the inner race 60 of the antifriction bearing 56.

To preclude the entry of crop material particles, dust, dirt and the like, guard means is interposed between each of the roller supporting arms 52 and the oppositely disposed side of each roller. Further, this guard means and the roller are so fashioned for interfitting engagement as to define a labyrinthian separation 75 therebetween. As shown the guard means comprises cover plates 76 which are of annular form and which are gripped between the inner faces of the roller mounting arms 52 and the outer faces of the inner races 60 of the bearing 56. Thus the cover plates 76 are stationary with respect to the arms 52 and inner bearing races 60, and the roller 50 rotates with respect thereto.

Each of the cover plates 76 is provided with radially spaced inwardly projecting ribs 76a. Similarly the outer side surfaces of the roller have complementally formed outwardly facing grooves 50a therein in which the plate ribs 76a are received. Thus upon assembly the labyrinthian separation 75 is formed and a tortuous path is thereby provided which effectively precludes travel of any foreign matter internally of the roller.

Additionally the outer peripheral edge of each of the cover plates is chamfered as indicated at 78. Thus there is provided a surface that is directed angularly outward with respect to each of the rollers 50. Particles of material impinging upon the outer surfaces of the rollers 50 are thus directed away from the narrow exposed portion of the separations 75 between the rollers 50 and the guard plates 76 so that even the possibility of entry of such particles internally of the roller is further minimized.

I claim as my invention:

1. A roller assembly for rotatably compacting forage material into and through a plurality of die cells in an annular wafering chamber comprising, in combination, a pair of axially spaced arms adapted to be mounted for rotation within the wafering chamber, a shaft fixed to said arms and extending therebetween, a generally cylindrical roller, an antifriction bearing journalling said roller upon said shaft for rotation between said arms, said bearing including an outer race stationary with respect to said roller and an inner race stationary with respect to said shaft, a pair of closure plates carried by each end of said roller and respectively extending across the opposite ends of said bearing toward said inner race and mounting internally thereof a resilient seal circumferentially engaging said inner race for minimizing lubricant escape from said bearing, and a pair of circular guard plates interposed between and stationary with respect to said inner race and said arms and having on the surfaces thereof opposite said arms radially-spaced, axially-projecting annular ribs interfitting with complementally formed and disposed grooves in the side faces of said roller so as to define a labyrinthian separation therebetween for minimizing the entry of forage material from the wafering chamber internally of said roller.

2. A roller assembly for rotatably compacting forage material into and through a plurality of die cells disposed in an annular wafering chamber comprising, in combination, a roller adapted to be disposed in said chamber for traversing a path adjacent the entrance ends of said die cells, a roller support arm, a shaft carried by said arm, an antifriction bearing journalling said roller upon said shaft, said bearing having an inner race stationary with respect to said shaft and an outer race stationary with respect to said roller and defining a lubricant chamber between said races, said shaft having a passage therein communicating with said lubricant chamber through which lubricant can be supplied thereto, a closure including a pair of annular plates disposed in back-to-back relation and secured at their peripheries to said roller, and a resilient seal having a radial flange gripped between said pair of annular plates and an integral cylindrical portion circumferentially engaging said inner bearing race for minimizing the escape of lubricant from said bearing.

3. A roller assembly according to claim 2 including a guard fixed with respect to said arm and disposed in juxtaposed relation to the side of said roller, and means integrally formed on the respective sides of said guard and said roller defining a labryinthian separation therebetween for minimizing the entry of forage material from said wafering chamber internally of said roller.

4. A roller assembly according to claim 3 wherein said labryinthian separation comprises radially spaced, axially projecting annular ribs on said guard interfitting with complementally formed and disposed grooves in the side of said roller.

References Cited by the Examiner
UNITED STATES PATENTS

| | | | |
|---|---|---|---|
| 2,510,659 | 6/50 | Ristow | 308—187.1 |
| 2,859,075 | 11/58 | Hobbs et al. | 308—187.1 |

FOREIGN PATENTS

| | | |
|---|---|---|
| 1,012,107 | 4/52 | France. |
| 1,208,143 | 9/59 | France. |
| 1,250,174 | 11/60 | France. |

FRANK SUSKO, *Primary Examiner.*

WALTER SCHEEL, ROBERT C. RIORDON, *Examiners.*